United States Patent Office

3,431,263

Patented Mar. 4, 1969

1

2

3,431,263

CERTAIN 2-BENZENESULFONAMIDO-5-OXYPYRIMIDINES

Hans Priewe, Klaus Gutsche, Hedwig Langecker, Heinz Gibian, Erich Gerhards, and Alois Harwart, Berlin, Germany, assignors to Schering A.G., Berlin, Germany No Drawing. Filed Mar. 16, 1965, Ser. No. 440,312
Claims priority, application Germany, Mar. 19, 1964, Sch 34,826; Mar. 25, 1964, Sch 34,858; Apr. 29, 1964, Sch 35,070
U.S. Cl. 260—256.5 13 Claims
Int. Cl. C07d *51/42*

ABSTRACT OF THE DISCLOSURE

Compounds of the formula

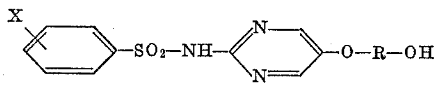

wherein X is hydrogen, halogen, lower alkyl, or lower alkoxy, and R is lower alkylene have a prolonged depressing effect on the blood sugar level. They are prepared by conventional methods or by Vilsmeier formylation of 2-alkoxy-1,4-dioxane, 2-halo-1,4-dioxane, or 1,4-dioxene followed by condensation of the formylation product with a benzenesulfoguanidine to close the pyrimidine ring.

The invention relates to pharmacological agents capable of reducing the blood sugar level in mammals, while having low toxicity for such mammals, and more particularly to certain derivatives of 2-sulfonamidopyrimidine and to methods for their manufacture.

We have found that sulfonamides of the formula

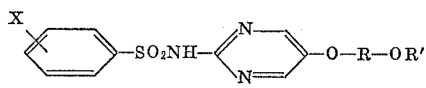

wherein X is hydrogen, halogen, and preferably chlorine, lower alkyl, or lower alkoxy; R is lower alkylene; and R′ is hydrogen or a radical of a lower or medium aliphatic carboxylic acid, of an aromatic or an araliphatic carboxylic acid; are superior blood-sugar level depressants when applied or taken orally. The blood-sugar depressing effect appears very quickly after oral ingestion and is much stronger with many of the new compounds than with known related compounds, for example, those disclosed in Belgian Patent No. 609,270. The toxicity of many sulfonamides of the invention is surprisingly low.

Table I below lists characteristic properties of representative compounds of the invention. The median lethal dose $LD_{50}$ in grams per kilogram body weight was determined in rats according to the method of Litchfield and Wilcoxen (J. Pharmacol. Exp. Ther. 96, 99 (1949)) after intravenous injection of the corresponding sodium salt.

The depression of the blood sugar level was determined in rabbits. The initial blood sugar concentration was measured after 24 hours fasting, whereupon an aqueous solution of the sodium salt of the tested substance was applied orally. The lowering of the blood sugar level was measured 2 and 6 hours after application.

TABLE I

| Compound | $LD_{50}$, g./kg. | Dosage, mg./kg. | Lowering of blood sugar level in percent of original concentration: After 2 hrs. | After 6 hrs. |
|---|---|---|---|---|
| 2-benzenesulfonamido-5-(β-hydroxy-α-methyl-n-propoxy)-pyrimidine | 4.3 | 125 | 40 | 40 |
| | | 62 | 40 | 39 |
| | | 31 | 25 | 28 |
| 2-benzenesulfonamido-5-(β-hydroxy-n-butoxy)-pyrimidine | 1.7 | 125 | 47 | 33 |
| | | 62 | 25 | 30 |
| 2-benzenesulfonamido-5-(β-hydroxy-n-propoxy)-pyrimidine | --------- | 125 | 43 | 48 |
| | | 62 | 49 | 48 |
| 2-benzenesulfonamido-5-(β-hydroxy-isopropoxy)-pyrimidine | 3.0 | 125 | 34 | 35 |
| 2-(4-methylbenzenesulfonamido)-5-(γ-hydroxy-n-butoxy)-pyrimidine | 1.1 | 125 | 24 | 36 |
| 2-(4-methylbenzenesulfonamido)-5-(β-hydroxy-n-propoxy)-pyrimidine | 2.0 | 62 | 22 | 30 |
| 2-(4-methylbenzenesulfonamido)-5-(β-hydroxy-α-methyl-n-propoxy)-pyrimidine | 1.7 | 62 | 28 | 43 |
| | | 31 | 18 | 29 |
| 2-(4-chlorobenzenesulfonamido)-5-(γ-hydroxy-n-butoxy)-pyrimidine | 0.9 | 125 | 15 | 29 |
| 2-(4-chlorobenzolsulfonamido)-5-(β-hydroxy-n-propoxy)-pyrimidine | 0.9 | 125 | 26 | 37 |
| | | 62 | 28 | 37 |
| | | 31 | 21 | 30 |
| 2-(4-chlorobenzenesulfonamido)-5-(β-hydroxy-α-methyl-n-propoxy)-pyrimidine | 0.9 | 31 | 18 | 38 |

The protracted effect of the sulfonamides of the invention on the blood sugar level is typically represented by the data of Table II on tests in which rabbits were given 125 mg./kg. of the tested compounds.

TABLE II

| Compound | Lowering of blood sugar level in percent of original concentration: After 16 hrs. | After 20 hrs. | After 30 hrs. |
|---|---|---|---|
| 2-benzenesulfonamido-5-(β-hydroxy-isopropoxy)pyrimidine | 26 | ----------- | ----------- |
| 2-benzenesulfonamido-5-(β-hydroxy-n-propoxy)-pyrimidine | 42 | 32 | 30 |

The salts of all physiologically tolerated inorganic or organic bases with the pyrimidine derivatives of the invention have the same effects on the blood sugar level. Suitable bases include the hydroxides of sodium, lithium, calcium, and ammonium, and such amines as methylglucamine, morpholine, piperazine, and ethanolamine. The sulfonamides of the invention may also be applied in mixtures with a suitable alkali metal bicarbonate or carbonate.

The active compounds of the invention are compatible and may be formulated in a conventional manner with addition agents carriers, taste masking agents, and excipients commonly employed in human and veterinary pharmacy for producing powder compositions, tablets, coated tablets, pills, suspensions, or solutions.

The compounds of the invention are readily prepared from intermediates of the formula

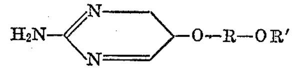

wherein R and R′ are the radicals referred to above. The pyrimidines of the above formula may be prepared according to the methods described hereinafter sub (a), (b), and (k).

Compounds of the formula

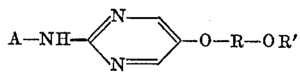

wherein A is hydrogen or the radical

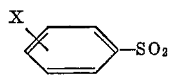

may be prepared by any one of the subsequently described methods.

Method (a).—Hydroxyalkoxyacetals of the formula

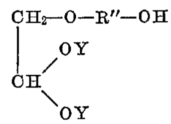

2-alkoxy- and 2-halo-1, 4-dioxacycloalkanes of the formula

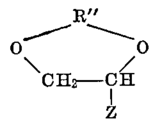

and 1,4-dioxa-cycloalkenes-(2) of the formula

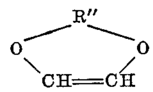

wherein R″ is a sautrated straight-chained or branched aliphatic radical whose carbon chain may also be interrupted by one or more oxygen atoms such as

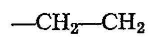

Y is a lower or medium alkyl radical, and Z is a lower or medium alkoxy radical or a halogen atom; may be formylated according to Vilsmeier's method. The 1,4-dioxacycloalkenes-(2) may also be formylated by addition of alkyl orthoformates to the double bond in the presence of an acid catalyst such as $BF_3$ or another Lewis acid, and the product obtained may be condensed with a guanidine of the formula

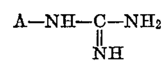

to close the ring.

Method (b).—Compounds of the formula

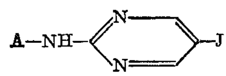

are reacted with alkali metal alcoholates of the formula MO—R—OH wherein M is alkali metal in the presence of copper or copper compounds at elevated temperature.

Method (c).—Compounds of the formula

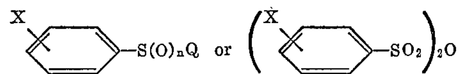

wherein Q is halogen, and *n* is an integer between zero and two, are reacted with pyrimidine derivatives of the formula

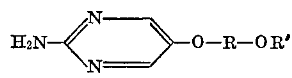

and the product obtained is oxidized to the sulfonic acid derivative, if necessary.

Method (d).—A compound of the formula

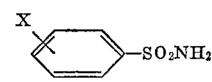

preferably in the form of its alkali metal salt, is reacted with a pyrimidine derivative of the formula

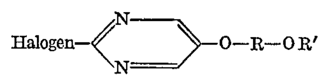

Method (e).—An alkali metal salt of the formula

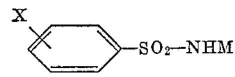

is reacted with a 2-trialkylammonium-5-(O—R—OR′)-pyrimidine salt.

Method (f).—A compound of the formula

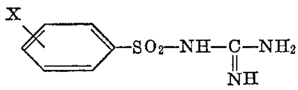

is condensed with a compound of the formula

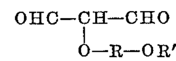

or with a derivative thereof in which the aldehyde function may be masked to close a ring.

Method (g).—A sulfonamide of the formula

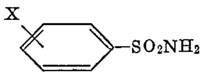

is reacted with a 2-nitroamino or a 2-cyanamino-5-(O—R—OR′) pyrimidine.

Method (h).—A sulfonic acid of the formula

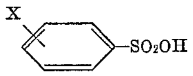

is reacted according to Freudenberg's method with a 2-acetylamino-5-(O—R—OR′)-pyrimidine.

Method (i).—Compounds of the formulas

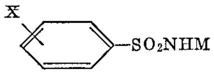

and

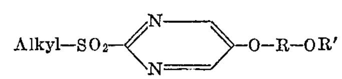

are reacted with each other.

Method (k).—Compounds of the formula

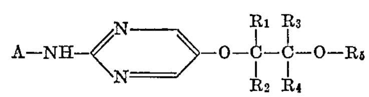

wherein $R_1$ to $R_4$ may be equal or different, and may be hydrogen or lower alkyl, and $R_5$ may be a saturated or unsaturated, straight chained, branched, cyclic or araliphatic hydrocarbon radicals may be subjected to one of the ether splitting reactions which are known from Houben-Weyl's Handbook on methods of organic chemistry.

Method (l).—A sulfonic acid of the formula

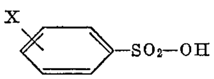

and a pyrimidine derivative of the formula

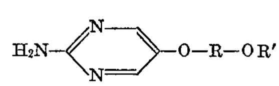

are reacted in the presence of a dehydrating agent, such as a carbodiimide or a diimidazolylcarbonyl or Woodward's reagent.

When R′ is hydrogen in the products obtained by methods (a) to (l), the free hydroxyl radical may be esterified, if so desired, with a physiologically tolerated acid, preferably a lower or medium aliphatic carboxylic acid, an aromatic or araliphatic carboxylic acid, in a manner conventional in itself. If R′ is the radical of an organic acid, the ester group may be saponified in a known manner and/or the products obtained may be converted to the corresponding salts by means of physiologically tolerated inorganic and/or organic bases.

The Vilsmeier method referred to sub (a) involves the formylation of the compounds mentioned by means of an N,N-disubstituted formamide in the presence of the chloride of an inorganic acid such as phosgene, $PCl_5$ or $POCl_3$. It is not necessary that the intermediates first formed during the reaction be converted to the corresponding acrolein derivatives by alkaline hydrolysis according to Arnold and Serm (Chem. listy 51,1082 (1957)) prior to condensation with a suitable guanidine derivative. The intermediates may be directly condensed with a guanidine of the formula

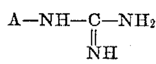

Method (a) permits the pyrimidine derivatives of the invention to be prepared in a surprisingly simple manner and in practical yields. The course of the reaction is particularly surprising because it was not to be expected that the necessary reagents such as $BF_3$, and particularly the inorganic acid chlorides would permit the formation of intermediates which would have a free hydroxyl group in the side chain in position 5 of the pyrimidine ring, as is intended here.

The following ether splitting reactions, known from Houben-Weyl's handbook, may be employed in Method (k): boiling with mineral acid, heating with pyridine hydrochloride, and also catalytic hydrogenation which is applicable only to certain ethers for example, the benzyl ethers. Those skilled in the art will have to determine by a preliminary experiment which method is most suitable for the specific ether at hand. The ether splitting reaction of the known methods may not only proceed in the desired direction, namely the splitting of the ether linkage directly attached to the pyrimidine ring, but the entire molecule may be affected to an extent which is not readily predictable, particularly by an excess of free hydrogen halide.

The desired ether splitting reaction proceeds with unexpected ease when the reaction is performed in a strong, nonoxidizing, inorganic acid, preferably phosphoric acid, by addition of alkali metal iodide, preferably in the equivalent amount, at a preferred temperature of 80–150° C., until the alkyl iodide formation is terminated. This method is preferred because the ether splitting reaction proceeds predominantly in the desired manner in which the ether linkage directly attached to the pyrimidine ring is hardly attacked.

EXAMPLE 1

30.9 g. 2-benzenesulfonamido-5-methoxyethoxypyrimidine were dissolved in 110 g. 90% phosphoric acid, and 17 g. KI were added. The mixture was heated to 110–120° C. for 1½ hours, and methyl iodide was distilled off. When the formation of methyl iodide was terminated, the reaction mixture was poured over 500 g. ice, and stirred for 2 hours. A precipitate formed and was filtered off with suction, washed with water, air dried, and recrystallized from chloroform. 15 g. 2-benzenesulfonamido-5-(β-hydroxy-ethoxy)-pyrimidine having a melting point of 147–149° C. were obtained.

When 32.5 g. 2-benzenesulfonamido-5-ethoxyethoxypyrimidine (M.P. 131–133° C.) are employed, ethyl iodide is driven off, and 2-benzenesulfonamido-5-(β-hydroxyethoxy)-pyrimidine is obtained in the same yield.

EXAMPLE 2

When the procedure of Example 1 is repeated with 32.5 g. 2-(4-methylbenzenesulfonamido)-5-methoxyethoxypyrimidine (M.P. 165° C.), and the product formed is recrystallized from chlorobenzene, there are obtained 16 g. 2-(4-methylbenzenesulfonamido)-5-(β - hydroxy-ethoxy)-pyrimidine of melting point 183–185° C.

EXAMPLE 3

A procedures analogous to that of Example 1 leads from 35 g. 2-(4-chlorobenzenesulfonamido)-5-methoxyethoxypyrimidine (M.P. 199–201° C.) to 2-(4-chlorobenzenesulfonamido) - 5 - (β-hydroxyethoxy)-pyrimidine of which 17 g. having a melting point of 179–180° C. are obtained after recrystallization from chlorobenzene.

EXAMPLE 4

15.5 g. 2-amino-5-(β-hydroxy-ethoxy)-pyrimidine were dissolved in 60 ml. pyridine, and 18 g. benzene sulfochloride were admixed. The mixture was stirred 5 hours at ambient temperature and the pyridine was then distilled off in a vacuum. The residue was mixed with 100 ml. of water, and acidified with hydrochloric acid. The resulting precipitate was filtered off with suction, air dried and recrystallized from ethanol. 20 g. 2-benzenesulfonamido-5-(β-hydroxyethoxy)-pyrimidine of melting point 147–149° C. were obtained.

EXAMPLE 5

29.5 g. 2-benzenesulfonamido-5-(β-hydroxyethoxy)-pyrimidine were dissolved in 250 ml. glacial acetic acid. 1 g. p-toluenesulfonic acid was added, and the solution was refluxed for two hours. The acetic acid was distilled off, the residue was digested with water, and recrystallized from ethanol. There were obtained 29 g. 2-benzenesulfonamido-5-(β - acetoxyethoxy)-pyrimidine of melting point 130° C.

EXAMPLE 6

31.5 g. 2-benzenesulfonamido-5-(β-butyroxyethoxy)-pyrimidine of melting point 120° C. in a manner analogous to that of Example 5 from the reaction of 29.5 g. 2-benzenesulfonamido-5-(β - hydroxyethoxy)-pyrimidine with n-butyric acid.

EXAMPLE 7

19.7 g. 2-amino-5-(β-acetoxyethoxy)-pyrimidine (M.P. 93° C.) were dissolved in 60 ml. pyridine, and the solution was stirred with 18 g. benzenesulfochloride for two hours at 50° C. The reaction mixture was then poured into 300 ml. ice water and acidified with hydrochloric acid. The precipitate obtained was filtered with suction and recrystallized from ethanol. There were obtained 27 g. 2-benzenesulfonamido-5-acetoxyethoxy-pyrimidine of melting point 130° C.

EXAMPLE 8

17.5 g. 2-chloro-5-(β-hydroxyethoxy)-pyrimidine and 18 g. benzenesulfonamide sodium were refluxed in 250 ml. dimethylformamide for three hours. The dimethylformamide was distilled off in a vacuum, and water was added to the residue. The precipitate formed thereby was separated from the liquid, dissolved in dilute ammonium hydroxide, and precipitated with acetic acid. The crude product recovered was recrystallized from ethanol. There were obtained 20 g. 2-benzene sulfonamido-5-(β-hydroxyethoxy)-pyrimidine of melting point 147–149° C.

EXAMPLE 9

20 g. p-toluenesulfonamide sodium and 32 g. 2-dimethylamino-5-(β - hydroxyethoxy)-pyrimidine iodomethylate were refluxed with agitation in 200 ml. toluene for 9 hours. The precipitate formed after cooling was filtered with suction aid dried and dissolved in dilute sodium hydroxide. Precipitation with hydrochloric acid yielded 22 g. 2 - (4 - methylbenzenesulfonamido)-5-(β-hydroxyethoxy)-pyrimidine whose melting point was 183–185° C. after recrystallization from ethanol.

EXAMPLE 10

22 g. 4-chlorobenzenesulfonamide sodium and 20 g. 2-nitroamino-5-(β-hydroxyethoxy)-pyrimidine were refluxed 3 hours in 250 ml. methylglycol. The solvent was distilled off in a vacuum, and water was added to the residue. The precipitate obtained was purified by dissolving in dilute ammonium hydroxide and precipitation with acetic acid. The precipitate was recrystallized from ethanol, and there were obtained 22 g. 2-(4-chlorobenzenesulfonamido)-5-(β-hydroxyethoxy)-pyrimidine of M.P. 179–180° C. aft.

EXAMPLE 11

36 g. (β-hydroxyethoxy)-acetaldehyde diethylacetal were dissolved in 150 ml. methylene chloride, and 60 g. phosgene were introduced at ambient temperature. 45 ml. dimethylformamide were added next drop by drop with external cooling. The methylene chloride was distilled off, and the residue was kept at 60° C. for 45 minutes. The mixture was diluted with a methanol solution of sodium methylate for neutralization, whereupon the mixture was refluxed for eight hours. The methanol was distilled off, and water was added to the residue. The excess of benzenesulfoguanidine was precipitated thereby, and was filtered off. The filtrate was acidified with HCl to yield 50 g. 2-benzenesulfonamido-5-(β-hydroxyethoxy)-pyrimidine, whose melting point was 147–149° C. after recrystallizing from ethanol.

EXAMPLE 12

By a method analogous to that of Example 11, 178 g. β-hydroxyethoxyacetaldehyde diethyl-acetal were reacted with 300 g. 4-methylbenzenesulfoguanidine to form 185 g. 2-(4-methylbenzenesulfonamido)-5-(β-hydroxyethoxy)-pyrimidine of melting point 183–185° C.

EXAMPLE 13

16.9 g. 2-amino-5-methoxyethoxy-pyrimidine dissolved in 100 g. 85% phosphoric acid, and 17 g. KI were added. The mixture was stirred for two hours at 100° C., and was then poured on about 500 g. ice. The solution was made akaline with potassium hydroxide, and was exhaustively extracted with ethyl acetate. The combined extracts were evaporated, and the residue was recrystallized from ethanol. There were obtained 12 g. 2-amino-5-(β-hydroxyethoxy)-pyrimidine of melting point 124–126° C. In an analogous manner, 18.5 2-(amino-5-ethoxyethoxy)-pyrimidine were converted to 11 g. 2-amino-5-(β-hydroxyethoxy)-pyrimidine.

EXAMPLE 14

74.1 g. triethyl orthoformate, 1.5 ml. boron trifluoride etherate, and 1 ml. absolute ether were mixed, and 43 g. p-dioxene were added drop by drop at 40° C. over two hours. The reaction mixture was further agitated for 2 hours, cooled in ice water, and diluted with 200 ml. ether. The clear solution was added drop by drop with vigorous agitation to 100 ml. ice cold 5% NaOH solution. The mixture obtained was repeatedly extracted with ether. The combined ether extracts were washed with 100 ml. water, dried over $K_2CO_3$, and the ether was distilled off. The residue was fractionated in the vacuum of a water jet pump. The fraction distilling at 125–127° C. at 13 mm. Hg consisted of 68.0 g. 2-ethoxy-1.4-dioxan-3-formyl-diethyl-acetal.

234 g. 2-ethoxy-1.4-dioxane-3-formyl-diethyl-acetal in 2 liters ethanol were mixed with 250 g. benzenesulfoguanidine. The mixture was cooled, saturated with HCl, and left to stand overnight. The ethanol was distilled off, and the residue was mixed with 1.5 liters water, and made alkaline with ammonium hydroxide. The excess of benzenesulfoguanidine was filtered off. The filtrate was acidified with hydrochloric acid, whereby about 150 g. 2-benzenesulfonamido-5-(β-hydroxyethoxy)-pyrimidine were precipitated. The compound melts at 147–149° C. after recrystallization from water.

EXAMPLE 15

100 g. phosgene was introduced into a solution of 150 g. dimethylformamide in 1.5 liters methylene chloride at −5° C. 86 g. 1,4-dioxene were added drop by drop with cooling and agitation. The mixture obtained was heated on a water bath to 60° C. whereby the methylene chloride was distilled off. Stirring of the residue at 60° C. continued after removal of the methylene, chloride for ¾ hour. After cooling to 20° C., 800 ml. methanol, and thereafter 200 g. guanidine nitrate were added. The solution was then neutralized by means of a methanol solution of NaOH. An excess of 65 g. NaOH was added, and the resulting mixture was refluxed for two hours. The inorganic salts precipitated were filtered from the hot mixture. When the filtrate cooled, 95 g. 2-amino-5-(β-hydroxyethoxy)-pyrimidine crystallized which had a melting point of 126–127° C. after recrystallizing from ethanol.

EXAMPLE 16

153 g. $POCl_3$ were added drop by drop to 300 g. dimethylformamide with external cooling by ice 86 g. 1,4-dioxene were added thereafter drop by drop without cooling. The mixture was slowly heated to 60° C., and the exothermal formylation reaction was initiated thereby. The reaction mixture was cooled to 20° C., after ¾ hour, diluted with 800 ml. methanol with further cooling, and neutralized with a sodium methylate solution.

250 g. benzenesulfoguanidine and 56 g. sodium methylate were then added, and the mixture was refluxed for eight hours. The methanol was then distilled off with agitation. The residue was mixed with 2 liters water, the excess of benzenesulfoguanidine remaining undissolved, and being filtered off. The filtrate was purified with carbon, and acidified with hydrochloric acid. The precipitate formed consisted of about 180 g. 2-benzenesulfonamido-5-(β-hydroxyethoxy)-pyrimidine which melted at 147–149° C. after recrystallizing from water.

EXAMPLE 17

208 g. $PCl_5$ and thereafter 200 ml. dimethylformamide were added at 0° C. with agitation to 132 g. 2-ethoxydioxane-1,4. The mixture then was slowly heated to 60° C. and kept ¼ hour at that temperature. After cooling to 20° C. and dilution with one liter methanol, 200 g. guanidine nitrate were added. The solution formed was neutralized by dropwise addition of sodium methylate solution. An excess of 90 g. sodium methylate was added, and the mixture was refluxed two hours. The inorganic salts were removed by filtration from the hot reaction mixture. About 100 g. 2-amino-5-(β-hydroxyethoxy)-pyrimidine crystallized from the filtrate upon cooling. The melting point was 126–127° C. after recrystallizing from ethanol.

EXAMPLE 18

100 g. phosgene were introduced into a solution of 150 g. dimethylformamide in 1.5 liters $CH_2Cl_2$ at −5° C. 122 g. 2-chlorodioxane-1,4 were then added drop by drop. The mixture was heated to 60° C. whereby the methylene chloride was distilled off. After removal of the methylene chloride, stirring was continued at 60° C. for ¾ hour. The reaction mixture was then cooled to 20° C., diluted with one liter methanol, and neutralized with sodium methylate with external cooling. 350 g. 4-chlorobenzenesulfoguanidine and 56 g. sodium methylate were then added, and the mixture was refluxed eight hours. The methanol was distilled off, and two liters water were admixed to the residue. The excess of chlorobenzenesulfoguanidine remained undissolved and was removed by filtration. The filtrate was clarified by charcoal treatment and acidfied with hydrochloric acid. A precipitate of about 190 g. 2-(4-chlorobenzenesulfonamido)-5-(β-hydroxyethoxy)-pyrimidine was formed. After recrystallization from methylglycol, the compound had a melting point of 179–180° C.

EXAMPLE 19

185 g. 2-(4-methylbenzenesulfonamido)-5-(β-hydroxyethoxy)-pyrimidine of melting point 183–185° C. were obtained in a manner analogous to the procedure of Example 18 from 178 g. β-hydroxyethoxyacetaldehyde diethylacetal and 300 g. 4-methylbenzenesulfoguanidine.

EXAMPLE 20

29.5 g. 2 - benzenesulfonamido-5-(β-hydroxyethoxy)-pyrimidine were dissolved in 250 ml. glacial acetic acid. 1 g. p-toluenesulfonic acid were added, and the solution was refluxed for two hours. The acetic acid was distilled off, the residue was digested with water and recrystallized from ethanol. There were obtained 29 g. 2-benzenesulfonamido-5-(β-acetoxyethoxy)-pyrimidine of melting point 130° C.

EXAMPLE 21

20 g. 4 - hydroxy-n-butoxy-acetaldehyde diethylacetal were dissolved in 100 ml. methylene chloride, and 30 g. phosgene were introduced at 20–25° C. 22 g. dimethylformamide were added drop by drop at above 0° C. The methylene chloride was distilled off, and the residue was stirred at 60° C. for 45 minutes. After cooling the mixture was diluted with 200 ml. methanol, and 30 g. methoxybenzenesulfoguanidine (M.P. 205–207° C.) and 17 g. sodium dissolved in methanol were added with cooling. The mixture was refluxed for eight hours. The methanol was distilled off and water was added to the residue. The precipitate was filtered off, the residue was mixed with water and acidified. The precipitate was filtered off. The melting point of the resulting 2-(p-methoxybenzenesulfonamido)-5-(4-hydroxy-n-butoxy)-pyrimidine (23 g.) was 137–139° C. after recrystallization from acetone/water.

EXAMPLE 22

12 g. 3-formyl-1,4-dioxene of melting point 43° C. were prepared by addition of ethyl orthoformate to 1,4-dioxene and subsequent acid saponification of the intermediate, 2-ethoxy-1,4-dioxane-3-formyl diethylacetal, and dissolved in 200 ml. ethanol. 25 g. benzenesulfoguanidine were added, and the mixture was saturated with HCl. The ethanol was distilled off after 24 hours, and water was added to the residue. The precipitate formed was recovered and recrystallized from ethanol, whereby 22 g. 2-benzene-sulfonamido - 5 - (β-hydroxyethoxy)-pyrimidine of melting point 147–149° C. were obtained.

EXAMPLE 23

A procedure analogous to that of Example 5 produced the 2 - benzenesulfonamido-5-(β-pivaloyloxyethoxy)-pyrimidine of melting point 158° C. from 2-benzenesulfonamido-5-(β-hydroxyethoxy)-pyrimidine and pivalic acid.

EXAMPLE 24

2-benzenesulfonamido-5-(β-hydroxyethoxy)-pyrimidine and benzoic acid were reacted in a manner analogous to the process of Example 5 to produce the 2-benzenesulfonamido - 5 - (β-benzoyloxyethoxy)-pyrimidine of melting point 184–185° C.

EXAMPLE 25

16.3 g. 2-benzenesulfonamido-5-(β-hydroxyethoxy)-pyrimidine were dissolved in 300 ml. ethanol, and a solution of 4 g. NaOH in ethanol was added. The precipitate formed was filtered off with suction after cooling, and was washed with ethanol. There were obtained 16 g. 2-benzenesulfonamido-5-(β-hydroxyethoxy)-pyrimidine sodium of melting point 238–240° C.

EXAMPLE 26

30 g. phosgene were introduced at 20–25° C. into a solution of 19 g. β-hydroxy-n-propoxy-acetaldehyde diethylacetal (B.P.$_{12}$ 111–115° C.) in 100 ml. methylene chloride. 22 g. dimethylformamide were then added drop by drop at temperatures below 0° C. The solvent was then distilled off, and the residue was heated to 60° C. for ¾ hour. The mixture was cooled and diluted with 200 ml. methanol, and 25 g. benzenesulfoguanidine and a solution of 17 g. sodium in methanol were added. The mixture was refluxed eight hours. The methanol then was distilled off, and the residue was mixed with water. The precipitated benzenesulfoguanidine was removed by filtration, and a crude product was precipitated from the filtrate by acid. Fractionated crystallization from ethanol yielded 10 g. 2-benzenesulfonamido-5-(β-hydroxy-n-propoxy)-pyrimidine of melting point 187–189° C., and 10 g. 2-benzenesulfonamido - 5 - (β-hydroxyisopropoxy)-pyrimidine M.P. 146–148° C.

EXAMPLE 27

The method of Example 26, when applied to p-toluenesulfoguanidine, yielded 18 g. 2-p-toluenesulfonamido-5-(β-hydroxy-n-propoxy)-pyrimidine of melting point 181° C.

EXAMPLE 28

When p-chlorobenzenesulfoguanidine was employed in the method of Example 26, there were obtained 19 g. 2 - p - chlorobenzenesulfonamido-5-(β-hydroxyethoxy-n-propoxy)-pyrimidine, M.P. 160–162° C.

EXAMPLE 29

20 g. 2-methyl-β-hydroxy-n-propoxyacetaldehyde diethylacetal (B.P.$_{12}$ 115–119° C.) when used in the procedure of Example 26 with benzenesulfoguanidine yielded 20 g. 2 - benzenesulfonamido - 5 - (β-hydroxy-α-methyl-n-propoxy)-pyrimidine M.P. 160–165° C. The substance consists of two racemates and therefore does not have a sharp melting point.

EXAMPLE 30

With the use of toluenesulfoguanidine and α-methyl-β-hydroxy-n-propoxyacetaldehyde diethylacetal, the procedure of Example 26 leads to a racemic mixture of 2-p-toluenesulfonamido - 5-(β-hydroxy-α-methyl-n-propoxy)-pyrimidine, M.P. 144–145° C.

EXAMPLE 31 p - Chlorobenzenesulfoguanidine and a α -methyl-β-hydroxy-n-propoxyacetaldehyde diethylacetal, when reacted according to Example 26 yield 2-p-chlorobenzenesulfonamido - 5-(β-hydroxy-α-methyl-n-propoxy)-pyrimidine of melting point 161–162° C.

EXAMPLE 32

22 g. 4-hydroxy-n-butoxyacetaldehyde diethylacetal (B.P.$_{15}$ 140–145° C.) when reacted with 25 g. benzenesulfoguanidine in the manner of Example 26 are converted to 20 g. 2-benzenesulfonamido-5-(4-hydroxy-n-butoxy)-pyrimidine, M.P. 144° C.

EXAMPLE 33

The method of Example 26 when applied to 22 g. 3-hydroxy-n-butoxy-acetaldehyde diethylacetal (B.P.$_{15}$ 130–135° C.) and 25 g. benzenesulfoguanidine produces 25 g. 2 - benzenesulfonamido - 5-(β-hydroxy-n-butoxy)-pyrimidine, M.P. 150° C.

EXAMPLE 34

The use of p-chlorobenzenesulfoguanidine and 3-hydroxy-n-butoxyacetaldehyde diethylacetal in the same procedure yields 2 - p - chlorobenzenesulfonamido-5-(γ-hydroxy-n-butoxy)-pyrimidine M.P. 175° C.

EXAMPLE 35 p-Toluenesulfoguanidine and 3-hydroxy-n-butoxyacetaldehyde diethylacetal were converted by the method of Example 26 to 2-p-toluene-sulfonamido-5-(γ-hydroxy-n-butoxy)-pyrimidine, M.P. 165° C.

EXAMPLE 36

76.6 g. of the dry sodium salt of 2-benzenesulfonamido-5-iodopyrimidine were stirred under a nitrogen blanket into 500 ml. 1,2-propylene glycol, and the solution was heated. When it reached 110° C., 16 g. NaOH were added, and at 130° C. 3.0 g. of powdered, crystalline copper sulfate. The resulting mixture was stirred at 130–150° C. for about four to five hours, and the excess of propylene glycol was distilled off at 5 torr. The dark residue was dissolved in water, acidified with dilute hydrochloric acid, and the solution was exhaustively extracted with ethyl acetate. The extract was clarified with decolorizing carbon and dried over desiccated sodium sulfate, whereupon the ethyl acetate was distilled off, and the residue was ground with a little ether. The crude product was further purified by dissolving it in ammonium hydroxide solution, treating with activated char, and precipitating from the filtrate with hydrochloric acid. The precipitate was dried and recrystallized twice from isopropanol. After drying, there were obtained 45.3 g. 2-benzenesulfonamido-5-(2'-hydroxy-propoxy)-pyrimidine of melting point 180–183° C.

While preferred methods and products have been described hereinabove, it is to be noted that various modifications as to procedure and use of ingredients may be made without departing from the spirit and scope of the invention as claimed herein.

We claim:

1. A compound of the formula:

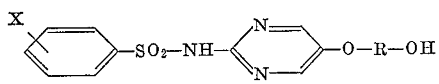

wherein X is hydrogen, halogen, lower alkyl, or lower alkoxy, and R is lower alkylene.

2. A salt of a compound as claimed in claim 1 with a physiologically tolerated base.

3. A compound as set forth in claim 1, wherein X is chlorine.

4. 2 - benzenesulfonamido - 5 - ($\beta$ - hydroxyethoxy)-pyrimidine.

5. 2-(4-chlorobenzenesulfonamido) - 5 - ($\beta$ - hydroxy-ethoxy)-pyrimidine.

6. 2-benzenesulfonamido-5-($\beta$-hydroxy - n - propoxy)-pyrimidine.

7. 2-(4-chlorobenzenesulfonamido) - 5 - ($\beta$-hydroxy-n-propoxy)-pyrimidine.

8. 2-benzenesulfonamido-5-($\beta$-hydroxy - $\alpha$ - methyl - n-propoxy)-pyrimidine.

9. 2-(4-chlorobenzenesulfonamido) - 5 - ($\beta$-hydroxy-$\alpha$-methyl-n-propoxy)-pyrimidine.

10. 2-benzenesulfonamido - 5 - (g-hydroxy-n-butoxy)-pyrimidine.

11. 2-(4-chlorobenzenesulfonamido) - 5 - (g-hydroxy-n-butoxy)-pyrimidine.

12. 2-(4-methylbenzenesulfonamido) - 5 - (g-hydroxy-n-butoxy)-pyrimidine.

13. 2-benzenesulfonamido - 5 - ($\beta$ - hydroxyethoxy)-pyrimidine sodium.

References Cited

UNITED STATES PATENTS

| | | | |
|---|---|---|---|
| 3,288,793 | 11/1966 | Priewe et al. ______ | 260—256.5 |
| 3,317,536 | 5/1967 | Grussner et al. _____ | 260—256.5 |

ALEX MAZEL, *Primary Examiner.*

R. J. GALLAGHER, *Assistant Examiner.*

U.S. Cl. X.R.

167—65; 260—247.1, 211, 256.4, 340.6, 340.9, 338, 615, 602, 251